(12) United States Patent
Hofer et al.

(10) Patent No.: US 10,131,112 B2
(45) Date of Patent: Nov. 20, 2018

(54) CARBON COMPOSITE COMPONENT

(71) Applicant: MAGNA STEYR Fahrzeugtechnik AG & Co KG, Graz (AT)

(72) Inventors: Bernhard Hofer, Graz (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 345 days.

(21) Appl. No.: 14/045,948

(22) Filed: Oct. 4, 2013

(65) Prior Publication Data

US 2014/0099498 A1 Apr. 10, 2014

(30) Foreign Application Priority Data

Oct. 4, 2012 (EP) ..................................... 12187227

(51) Int. Cl.
*B32B 5/02* (2006.01)
*B29C 70/88* (2006.01)
*B29C 70/02* (2006.01)
*D04C 1/02* (2006.01)
*B29L 9/00* (2006.01)

(52) U.S. Cl.
CPC .............. *B32B 5/02* (2013.01); *B29C 70/028* (2013.01); *B29C 70/885* (2013.01); *D04C 1/02* (2013.01); *B29L 2009/003* (2013.01); *Y10T 428/249922* (2015.04)

(58) Field of Classification Search
CPC ........................ B32B 5/02; Y10T 428/249922
USPC .................................................. 428/222; 87/3
See application file for complete search history.

(56) References Cited

U.S. PATENT DOCUMENTS

| | | | | |
|---|---|---|---|---|
| 3,428,278 A | * | 2/1969 | Ardelle | B21F 27/005 245/8 |
| 5,100,713 A | * | 3/1992 | Homma | B29C 70/10 139/383 R |
| 2002/0182961 A1 | * | 12/2002 | Clercq | B29C 70/22 442/316 |
| 2005/0211082 A1 | * | 9/2005 | Angeloni | B29C 70/885 87/3 |
| 2006/0110599 A1 | * | 5/2006 | Honma | B32B 5/10 428/413 |
| 2010/0103582 A1 | | 4/2010 | Shimp et al. | |
| 2011/0031350 A1 | | 2/2011 | Sayilgan et al. | |

FOREIGN PATENT DOCUMENTS

| | | |
|---|---|---|
| CN | 1642781 A | 7/2005 |
| CN | 1676706 A | 10/2005 |
| EP | 1584451 A1 | 10/2005 |
| EP | 1483137 B1 | 4/2007 |
| GB | 2041824 | 9/1980 |
| WO | 1992018329 A1 | 10/1992 |
| WO | 20050118263 A1 | 12/2005 |
| WO | 2010004262 A2 | 1/2010 |

\* cited by examiner

*Primary Examiner* — Vincent Tatesure
(74) *Attorney, Agent, or Firm* — Jordan IP Law, LLC; Todd A. Vaughn

(57) ABSTRACT

A carbon composite component composed of a plastics-carbon-fiber composite material. The carbon composite component is made up of individual regions, in which at least one ply is composed, in at least a first region, of carbon fibers, and at least one additional region and/or the first region includes a ply which is composed of metal cords which are arranged spaced apart from one another and spatially oriented in at least one direction.

20 Claims, 2 Drawing Sheets

CARBON COMPOSITE COMPONENT

CROSS-REFERENCE TO RELATED APPLICATIONS

The present application claims priority 35 U.S.C. § 119 to European Patent Publication No. EP 12187227.9 (filed on Oct. 4, 2012), which is hereby incorporated by reference in its entirety.

TECHNICAL FIELD

Embodiments relate to a carbon composite component composed of a plastics-carbon-fibre composite material. The carbon composite component has a plurality of individual regions, in which at least one ply composed of carbon fibres is provided in at least one region, and at least one additional region and/or the first region has a ply which is composed of metal cords arranged spaced apart from one another and oriented in at least one direction.

BACKGROUND

A composite material is a combination of at least two or more different active substances which exhibit clearly distinct physical or chemical properties. The resulting composite material combines the physical and/or chemical properties of its constituents. At the same time, the positive properties for the respective application are emphasized, and the least desired properties are suppressed. Here, the components are selected and combined with one another such that each substance is drawn upon to impart its special properties that are required for the present situation.

In the automobile industry, among others, use is increasingly being made of carbon composite material for lightweight components. As a result of the low weight of the composite material, the increase in weight in automobile construction is compensated. Carbon composite materials are used above all for use in safety-relevant regions, for example, as a reinforced collision impact absorber.

For example, European Patent Publication EP 1483137 B1 discloses a collision impact absorber which is reinforced with a metal cable belt, in which the metal cables or wires are arranged in one or more planes. Here, the metal cables are laminated between foils composed of polymer material. For the production of the collision protection mechanism, a regular orientation of the metal cables is expedient, but the metal-plastics composite material is not optimally conFig.ured for the absorption of forces.

Great Britain Patent Publication GB 2041824 discloses a composite material composed of carbon-fibre-reinforced plastic in combination with metal-wire woven fabric. Here, the composite material is constructed in an alternating fashion from the reinforced plastic and from the metal laid fabric. Such a construction is expedient for use for homogeneous components with uniform behaviour with respect to forces that are introduced.

SUMMARY

Embodiments solve the problem of producing a component from a composite material, which component, being divided into a plurality of different regions, not only has the different layers or plies of the composite material itself, but also has different properties distributed over regions of the component.

In accordance with embodiments, the problem may be solved by way of a carbon composite component composed of a plastics-carbon-fibre composite material. The carbon composite includes a plurality of individual regions, in which at least one ply is composed, in at least a first region, of carbon fibre composite material, and at least one additional region and/or the first region includes a ply which is composed of plastic reinforced with metal cords. The metal cords may be advantageously arranged spaced apart from one another and spatially oriented in at least one direction.

In accordance with embodiments, it may be advantageous for metal cords, that is to say more than one individual wire, to be used, and for the at least two wires to be twisted or stranded and/or braided to form a metal cord. Only as a result of the stranding is the metal cord provided with its typical elasticity and stretchability over and above the metal properties of an individual wire.

It is specifically as a result of the connection of the carbon composite material to the metal cords that the desired elasticity of the component may be attained, which may be used, for example, for safety-relevant components in the field of collision protection. The stranding of the metal wire to form metal cords leads to an enhanced elasticity, which is an ideal complement to the brittle material of the carbon composite plastic. The elasticity of the material may be advantageously enhanced through the use of steel for the metal cords.

In accordance with embodiments, it may be also advantageous for the metal cords to be connected, for example woven, to form a bi-directionally oriented metal laid fabric. In this way, the elasticity may be enhanced in more than one direction, and the component as a whole may be optimized.

In accordance with embodiments, for the construction of the carbon composite component, it may also be advantageous for the metal cords to be spatially situated between, or on and/or over the carbon-fibre-reinforced plies of the carbon composite component. In this way, the properties of the composite material may be optimized, because a high level of flexibility for the positioning of the metal cords may be provided.

In accordance with embodiments, it may further be advantageous that, in the case of steel cords being used as metal cords, a ply of insulating material be provided between the metal cords and the carbon fibres in order to minimize corrosion.

In accordance with embodiments, the insulating material may advantageously be a ply of plastic of the plastics composite matrix. Alternatively, it may be advantageous to use glass-fibre-reinforced plastic which both may be used as an insulating ply and also to enhance the plasticity of the composite which serves to counteract the brittle behaviour of the carbon layers. If glass-fibre-reinforced plastic is used, it may be possible to produce components and structures whose structure is rather preserved in the event of a collision and in which the metal inlays are protected against corrosion.

As a result of the integration of the metal laid fabric into the carbon composite component, it may be advantageously possible for metallic connecting elements to be integrated. Here, the metallic connecting elements serve firstly for the connection of the components to further components for example on a motor vehicle body, and also for the connection of the component to the electrical earth of the motor vehicle.

Specifically, the connection to electrical earth is a problem that arises in the case of vehicles having a low metal content. For such vehicles, the laying of additional earth lines would then be dispensed with. As a result of the installation of metal laid fabrics into the composite, the electromagnetic compatibility of the vehicle as a whole is likewise enhanced. As a result of the use of such metal laid fabrics in the carbon composite components, a Faraday cage is in turn produced, thus facilitating shielding as in the case of a conventional vehicle composed of sheet metal.

For the production of plastics composite components, it may be also advantageous for the metal laid fabric to form a core around which the component may be produced by the application of further layers, of insulating or non-insulating type, composed of glass-fibre-reinforced and/or carbon-fibre-reinforced plies.

In accordance with embodiments, a composite component may include at least one of the following: a component body composed of a plastics-carbon-fibre composite material, the component body having a plurality of regions each having different structures, in which: provided in a first region is at least one first ply of the component body which is composed of carbon fibre composite material; and provided in the first region is a second ply of the component body which is composed of metal cords arranged spaced apart from each other in at least one spatial orientation.

In accordance with embodiments, a composite component may include at least one of the following: a component body composed of a plastics-carbon-fibre composite material, the component body having a plurality of regions with different structures, including a first region with a pair of spaced apart first layers composed of a carbon fibre composite material, and a second region with a pair of spaced apart second layers composed of a metal material which are arranged between the first layers, and an insulating material arranged between each second layer and a corresponding first layer.

DRAWINGS

Embodiments will be illustrated by way of example in the drawings and explained in the description below.

DESCRIPTION

Figure 1:
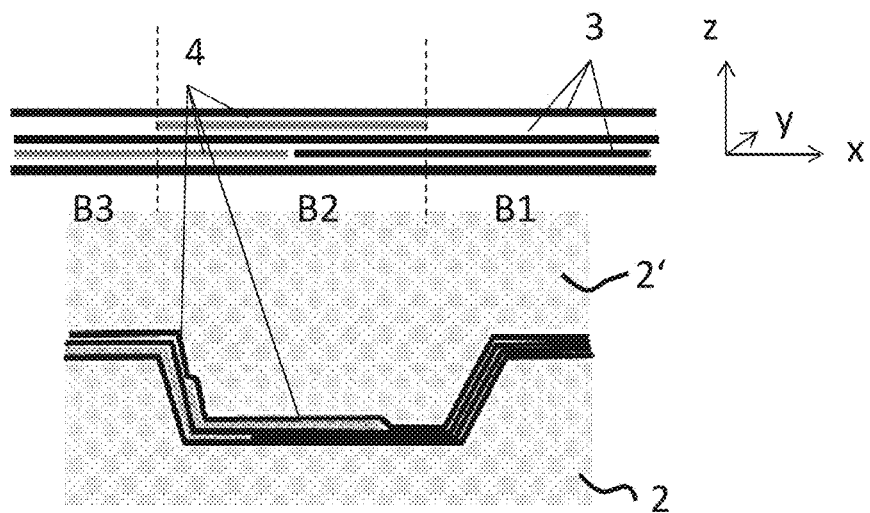
FIG. 1 illustrates a composite component, in accordance with embodiments.

FIG. 1 illustrates, in accordance with embodiments, a construction of layers that may be prepared on a planar surface. As illustrated in FIG. 1, different pre-impregnated fibre layers composed of, for example, carbon fibres 3 are provided. The pre-impregnated fibre layers are referred to as prepreg and are composed of fibres and of an unhardened thermosetting plastics matrix.

Layers 4 composed of metal cords are spatially arranged on and/or over or between the carbon-fibre layers 3. The component has different regions B1, B2, B3. The regions B1, B2, B3 are defined in the x, y plane and not in the layer plane z of the component. The regions B1, B2, B3 may be of different sizes and may have different shapes in the x, y plane. Only plies of carbon-fibre-reinforced material 3 are provided in the region B1 of the component. In the region B2, the component has two plies of metal cords 4, and in the region B3, the component has a ply with a metal-cord laid fabric. Onto a first layer composed of carbon-fibre-reinforced plastic, there may be laid a second layer, in this case alternatively a layer composed of carbon-fibre-reinforced plastic or a metal laid fabric. Depending on the loading of the individual regions B1, B2, B3, metal laid fabrics or further carbon-fibre-reinforced plastics plies are layered one on top of the other. This process of layering of the prefabricated metal laid fabric and of fibre-reinforced pieces may take place in an automated manner.

The lower part of FIG. 1 illustrates a tool which has a lower tool part 2 and an upper tool part 2'. In the tool 2, 2', the prepared component 1 may be deformed and may be either hardened in an autoclave or, with the aid of an RTM process, may be injected with a moulding compound and hardened under the action of heat and pressure.

Figure 2:
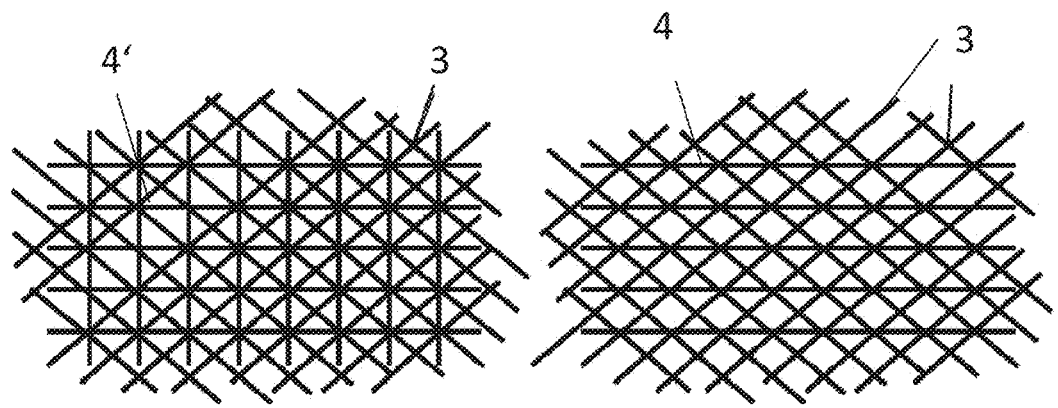
FIG. 2 illustrates a schematic illustration of the metal laid fabric, in accordance with embodiments.

FIG. 2 illustrates an exemplary arrangement of prepregs in accordance with embodiments. The carbon-fibre-reinforced material 3 may in this case be a uniform woven fabric composed of carbon fibres. For the implementation of embodiments, however, the use of carbon-fibre-reinforced material in which the carbon fibres have a predetermined spatial orientation may also be provided. On the right-hand side of FIG. 2, the metal laid fabric 4 may be spatially oriented horizontally. The metal laid fabric 4 comprises metal cords which are produced from at least two wires which are twisted around one another. The metal cords that are bundled together from wires are in this example laid parallel to and spaced apart from one another.

On the left-hand side of FIG. 2, the metal cords are arranged perpendicular to the horizontal arrangements of further metal cords and form a metal cord grid as a metal laid fabric, the latter being inlaid as a whole into the component 1.

The arrangement of the metal cords illustrated in FIG. 2 may be merely one possible embodiment. For example, the metal cords may form a metal laid fabric 4 which may be of reinforced form at one point by way of a denser lay pattern of the metal cords and which may be of weaker form at other points by way of a less dense lay pattern. It is also not necessary for the metal cords to be parallel.

Figure 3:
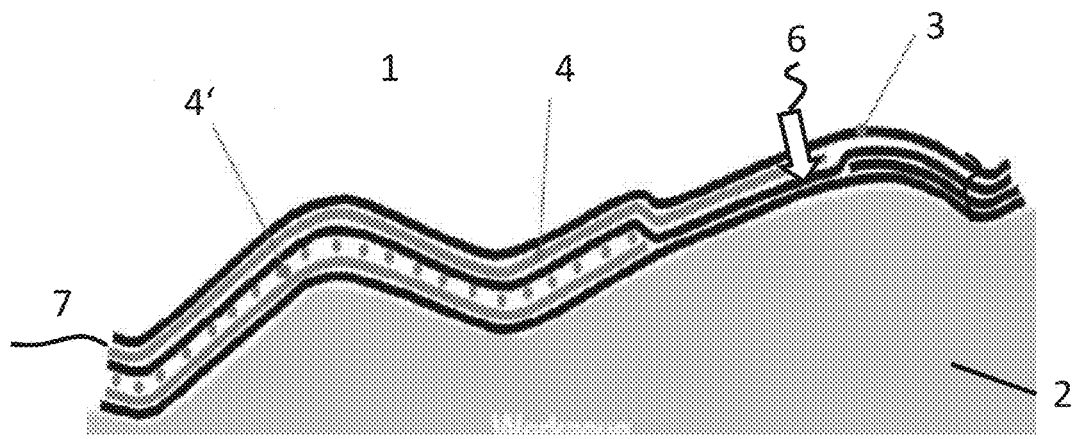
FIG. 3 illustrates a three-dimensional composite component, in accordance with embodiments.

FIG. 3 illustrates a further component 1 which may be constructed on the surface of a lower tool part 2. The component 1 may be in turn composed of different, alternating layers of carbon-fibre-reinforced plies 3 or uni-directional metal laid fabrics 4 or bi-directional metal laid fabrics 4'. By way of the different spatial orientation of the metal cords in the metal laid fabrics 4, 4', the component 1 that is produced is optimized in terms of its elasticity.

In FIG. 3, there is provided, by way of example, a connecting element 6. Such a connecting element may be, for example, a screw with a washer which is anchored in the metal laid fabric, or pierced into the metal laid fabric. The integration of the connecting element 6 is advantageous if the structural element is not to become detached from the vehicle, and for the connecting elements to still be able to produce a residual connection to the vehicle, in the event of a collision. Here, the type of connecting element 6 may be freely selected by a person skilled in the art. Any type of connecting element that is familiar to a person skilled in the art is suitable for use in accordance with embodiments.

FIG. 3 schematically indicates a further component, an earth connection 7. By way of such an earth connection 7, the metal laid fabric 4 is connected to the electrical earth of the vehicle.

Figure 4:
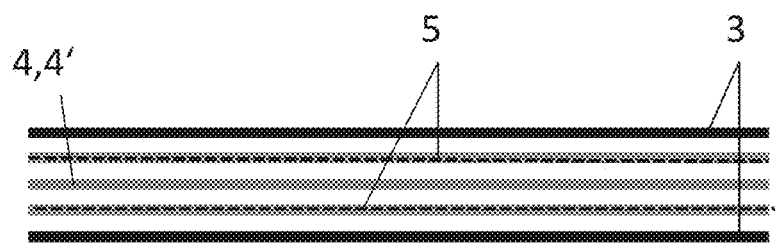
FIG. 4 illustrates a component having insulation layers, in accordance with embodiments.

Metal wires, such as, for example, steel wires, may be used for the production of the metal laid fabric 4. If steel wires are used, it must be taken into consideration that corrosion occurs on the steel wires if the steel comes into contact with the carbon fibres. To minimize this problem, as illustrated in FIG. 4, an insulation layer 5 is inserted between metal laid fabrics 4, 4', in this case the steel laid fabric and the carbon-fibre layers 3. The insulation layer 5 may be, in in accordance with embodiments, a layer of resin or the plastic of the plastics matrix, the layer being introduced in the production process and producing and filling out a spacing between the steel laid fabric and the carbon fibres. For this purpose, spacers may be placed onto the metal laid fabric in order to position the carbon-fibre-reinforced layer with a predefined spacing and hold the carbon-fibre-reinforced layer there until the resin or the plastic fills the intermediate space and produces the insulation 5. Alternatively, the insulation layer 5 may be produced from glass-fibre-reinforced plastic, which advantageously enhances the plasticity of the plastics composite and counteracts the brittle behaviour of the carbon-fibre layers. In an embodiment with an insulating glass-fibre-plastics layer, the component 1 may rather be preserved in the event of a collision, and the steel inlays are at the same time protected against corrosion. Further possible insulating layers are also materials such as cellulose, basalt and the like, which have purely an insulation effect but no further influence on the elasticity of the material.

To prevent the corrosion problem, use is made of aluminium metal cords, which may replace the steel cords. To produce the composite materials, use is made of known plastics matrices and resins.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A composite component, comprising:
   a component body composed of a plastics-carbon-fibre composite material, the component body having a plurality of regions each having different structures, wherein:
   provided in a first region of the regions is at least one first ply of the component body which is composed of two carbon-fibre composite material layers, at least one of the two carbon-fibre composite material layers including unidirectional carbon fibres extending in a first direction;
   provided in the first region is a second ply of the component body which is composed of a plurality of metal cords composed of individual metal wires which are twisted and/or braided with one another, and which are arranged spaced apart from each other in at least one spatial orientation to form a metal laid fabric having a bi-directional spatial orientation including a second direction and a third direction that are each different than the first direction, a first layer of unidirectional metal cords of the plurality of metal cords extending along the second direction, and a second layer of unidirectional metal cords of the plurality of metal cords extending along the third direction;
   in the first region, the first layer and second layer of unidirectional metal cords are arranged between the two carbon-fibre composite material layers of the at least one first ply; and
   provided in a second region of the regions is the at least one first ply, and in the second region the two carbon-fibre composite material layers are disposed on each other without the second ply of the component body, which is composed of the first and second layers of unidirectional metal cords, disposed therebetween.

2. The composite component of claim 1, wherein the plurality of metal cords are composed of steel.

3. The composite component of claim 1, wherein the metal laid fabric comprises integrated connecting elements.

4. The composite component of claim 3, wherein the integrated connecting elements are configured to connect composite components to each other.

5. The composite component of claim 3, wherein the integrated connecting elements facilitate a connection of the composite component to ground.

6. The composite component of claim 1, wherein the plurality of metal cords are separated from the carbon fibres by a ply of insulating material.

7. The composite component of claim 6, wherein the insulating material comprises a ply of the plastic which composes part of the plastics-carbon-fibre composite material.

8. The composite component of claim 6, wherein the insulating material comprises a glass-fibre-reinforced plastic or a glass fibre.

9. The composite component of claim 8, wherein the glass fibre comprises insulating spacers arranged between the plurality of metal cords and the carbon-fibre-reinforced at least one first ply.

10. The composite component of claim 1, wherein the plurality of metal cords form a core around which further plies of different material are wrapped in different regions.

11. A composite component, comprising:
    a component body composed of a plastics-carbon-fibre composite material, the component body having a plurality of regions with different structures, including a first region with a pair of spaced apart first layers composed of a carbon-fibre composite material, at least one of the pair of first layers including unidirectional carbon fibres extending in a first direction, and the first region including a pair of spaced apart second layers composed of a plurality of metal cords which are arranged between the first layers, and an insulating material arranged between each second layer and a corresponding first layer, wherein in the first region the plurality of metal cords are spaced apart from each other and composed of individual metal wires which are twisted and/or braided with one another to form a metal laid fabric having a bi-directional spatial orientation including a second direction and a third direction that are each different than the first direction, one layer of unidirectional metal cords of the plurality of metal cords extending along the second direction to be between the first layers in the first region, and another layer of unidirectional metal cords of the plurality of metal cords extending along the third direction to be between the first layers in the first region, wherein in a second region of the regions, the pair of first layers are disposed on each other without the one and another layers of unidirectional metal cords being disposed therebetween.

12. The composite component of claim 11, wherein the insulating material comprises a layer of the plastic which composes part of the plastics-carbon-fibre composite material.

13. The composite component of claim 12, wherein the insulating material comprises a glass-fibre-reinforced plastic or a glass fibre.

14. The composite component of claim 13, wherein the glass fibre comprise insulating spacers arranged between the plurality of metal cords and the carbon-fibre composite material.

15. A composite component for a collision impact absorber of a vehicle body, the composite component comprising:
  a component body composed of a composite material, the component body having a plurality of regions each having different structures and including a first region with first layers composed of a carbon-fibre composite material, at least one of the first layers including unidirectional carbon fibres extending in a first direction, and the first region including second layers composed of a plurality of metal cords composed of individual metal wires which are twisted and/or braided with one another, wherein in the first region the plurality of metal cords are arranged spaced apart from each other between the first layers in a bi-directional spatial orientation including a second direction and a third direction that are each different from the first direction, a first layer of unidirectional metal cords of the plurality of metal cords extending along the second direction to be between the first layers in the first region, and a second layer of unidirectional metal cords of the plurality of metal cords extending along the third direction to be between the first layers in the first region,
  wherein in a second region of the regions, the first layers of carbon-fibre composite material are disposed on each other without the first and second layers of unidirectional metal cords being disposed between the first layers of carbon-fibre composite material.

16. The composite component of claim 1, wherein:
provided in the second region is a third ply of the component body which is composed of a layer of unidirectional metal cords that extend along one direction and are disposed on one of the two carbon-fibre composite material layers of the second region.

17. The composite component of claim 11, wherein:
provided in the second region is a layer of unidirectional metal cords that extend along one direction and are disposed on one of the pair of first layers of the second region.

18. The composite component of claim 15, wherein:
provided in the second region is a layer of unidirectional metal cords that extend along one direction and are disposed on one of the first layers composed of the carbon-fibre composite material.

19. The composite component of claim 1, wherein in the first region, the first layer, and the second layer of unidirectional metal cords are disposed directly on each other and between the two carbon-fibre composite material layers of the first ply so that no carbon-fibre composite material layer is disposed between the first layer, and the second layer of unidirectional metal cords.

20. The composite component of claim 1, wherein a first of the two carbon-fibre composite material layers, the first layer of unidirectional metal cords, the second layer of unidirectional metal cords, and a second of the two carbon-fibre composite material layers are disposed in that stated order on a straight line perpendicular to both a longitudinal axis of the first layer of unidirectional metal cords, and a longitudinal axis of the second layer of unidirectional metal cords.

* * * * *